(12) United States Patent  
Santa Cruz et al.

(10) Patent No.: US 6,890,088 B2  
(45) Date of Patent: May 10, 2005

(54) DECORATIVE ILLUMINATION APPARATUS

(76) Inventors: Cathy D. Santa Cruz, 7630 Tholl Dr., Reno, NV (US) 89506; Erik Miller, P.O. Box 195, Verdi, NV (US) 89439

( * ) Notice: Subject to any disclaimer, the term of this patent is extended or adjusted under 35 U.S.C. 154(b) by 140 days.

(21) Appl. No.: 10/284,976

(22) Filed: Oct. 31, 2002

(65) Prior Publication Data

US 2004/0085773 A1 May 6, 2004

(51) Int. Cl.[7] .............................. B60Q 1/06; F21V 21/00
(52) U.S. Cl. ....................... 362/371; 362/806; 362/183; 362/285; 362/383; 362/418; 362/253; 362/364; 362/805; 362/153.1
(58) Field of Search ................................ 362/362, 806, 362/183, 285, 383, 418, 371, 253, 364, 805, 431, 153.1, 365, 145

(56) References Cited

U.S. PATENT DOCUMENTS

| | | | | |
|---|---|---|---|---|
| 1,458,329 A | * | 6/1923 | Elfelt | 362/136 |
| 3,873,880 A | * | 3/1975 | Riddell | 315/53 |
| 4,652,980 A | * | 3/1987 | Segan | 362/86 |
| 5,243,894 A | * | 9/1993 | Minovitch | 89/1.11 |
| 5,402,869 A | * | 4/1995 | Saltzman et al. | 190/108 |
| 5,649,758 A | * | 7/1997 | Dion | 362/103 |
| 6,132,059 A | * | 10/2000 | Leibowitz | 362/156 |
| 2001/0017775 A1 | * | 8/2001 | Reinert | 362/153 |

FOREIGN PATENT DOCUMENTS

FR 2588801 A1 * 4/1987 ............. F21S/8/00

* cited by examiner

Primary Examiner—Stephen Husar  
Assistant Examiner—Sharon Payne

(57) ABSTRACT

A novel illumination apparatus that may be formed from any object of choice, such as a natural rock or the like. The apparatus is of simple construction and allows a user to easily adjust the amount of light to be emitted there from. Or the user may direct the light in a preferred direction, and optional accessories are also provided, such as the apparatus may include, a motion detector, speakers, a cup-holder, a secret compartment, etc.

12 Claims, 4 Drawing Sheets

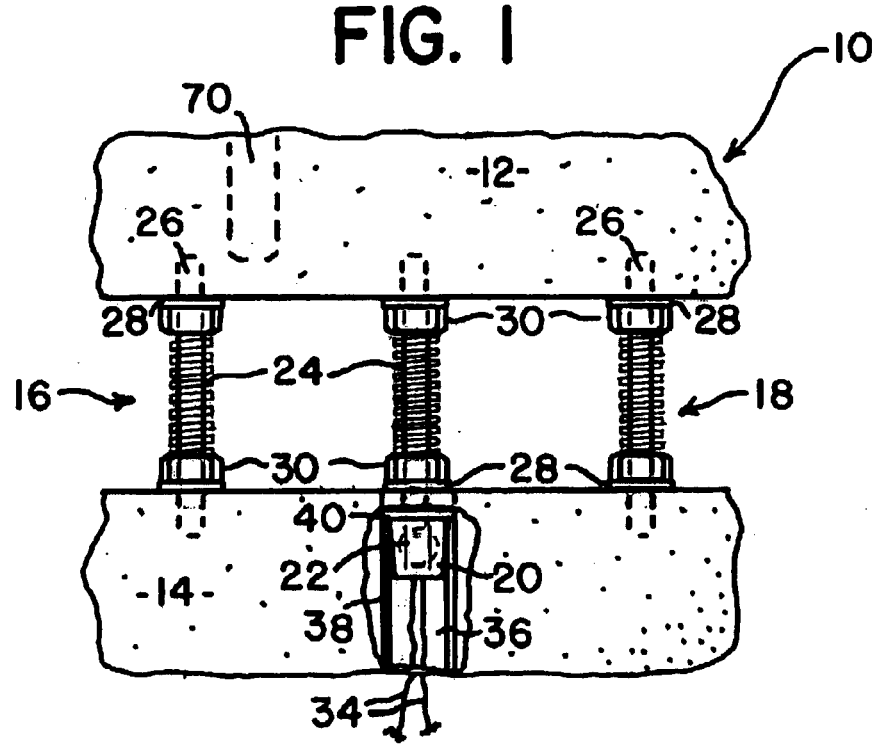
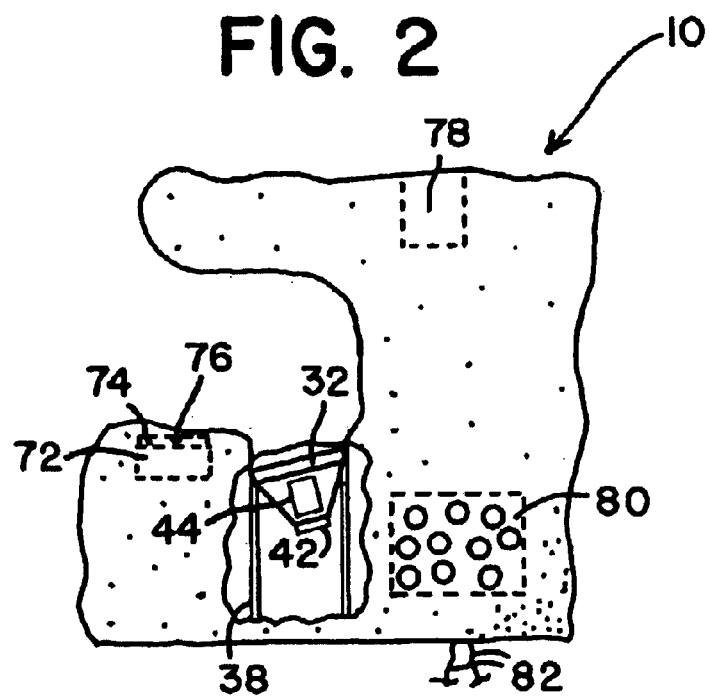

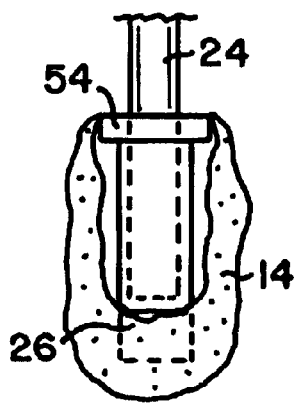
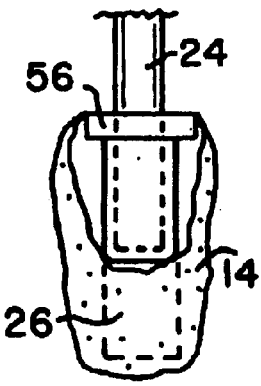
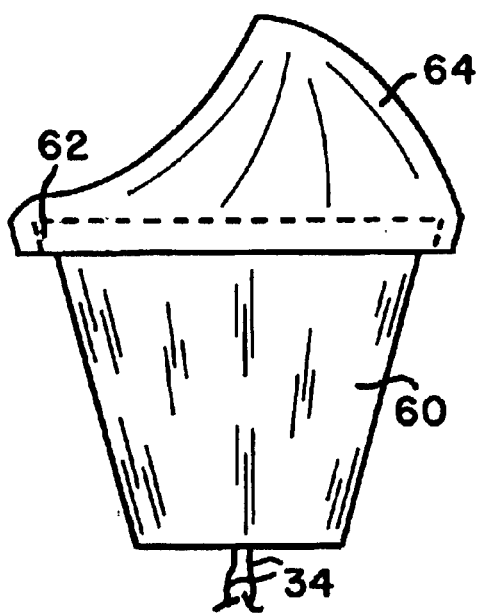
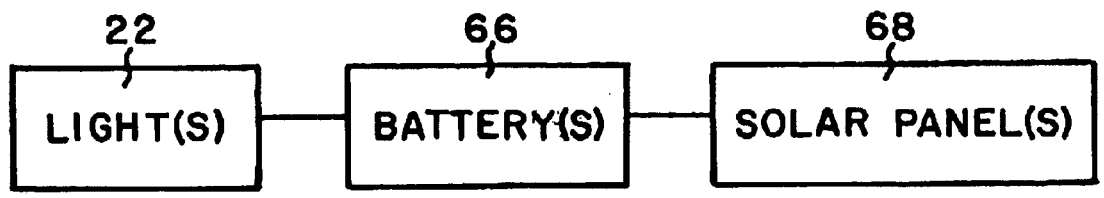

DECORATIVE ILLUMINATION APPARATUS

FIELD OF THE INVENTION

This invention relates in general to novel lighting devices that are aesthetically pleasing when viewed by the human eye, but more particularly pertains to a light source that is housed within an unusual object in a manner that substantially camouflages the light source. For example, the object may be in the form of a natural rock formation, a seashell, an inanimate item, or the like. Also, the light source may be of any suitable type, and the apparatus when constructed in the manner as taught herein is adjustable so as to allow a user to easily regulate the amount of light emitted there from. Furthermore depending on consumer needs, the apparatus may include additional options such as built in speakers, a secret compartment, a cup-holder, a motion detector, etc.

BACKGROUND OF THE INVENTION

It is well known within the landscaping business that consumers typically have outdoor lighting installed, not only for convenience but also for security and/or insurance purposes. Such lighting is most commonly installed along pathways, driveways, porches, and the like. However, there are numerous locations where outdoor lighting is further used to enhance a particular setting so as to draw attention thereto, and may also induce a feeling of serenity or provide a calming effect, which is commonly associated with soft lighting. For example, soft lighting is preferred and most useful when installed around ponds, streams, gardens, fountains, or anywhere that light is used to illuminate an object.

Therefore, within the known prior art many attempts have been made to provide attractive eye pleasing lighting, as most consumers do not want just plain ordinary bright lights. This is important as bright lights tend to be very distracting and may even cause uneasiness as a person may feel as though they have a spotlight on them.

Thus, attempts have been made to install lights within various fixtures so as to distract away from the light source itself Some examples of such lighting means include U.S. Pat. Nos. 4,716,508, 5,203,627, 4,996,636, and 5,692,828. Each of which are functional for there intended use but each have inherent drawbacks and disadvantages that the present invention recognizes, addresses, and resolves in a manner heretofore not taught.

However, it is apparent that the closest related prior art known to the applicants is taught in newly issued U.S. Pat. No. 6,168,290 entitled "GARDEN LAMP", issued to Christiansen on Jan. 2, 2001. Wherein, the lamp is formed from a natural rock which has been cut to form two opposing pieces but the lamp is very limited and it does not provide any means for adjusting the amount of light emitted there from. Nor does the lamp allow the user to easily adjustably project the light in a direction of their choosing. Also, the two pieces are spaced apart and fixedly attached together at a predetermined distance by at least three support legs. Also, this reference points out that limestone is the preferred type of rock. However, the present invention recognizes that most users prefer to have the natural rocks that are typically found in there specific area be used, as this allows the apparatus to easily blend in with the surrounding natural landscape. Therefore, it is desirable that the apparatus be formed either on site, or at a location in close proximity to the site so as to have access to the particular natural rock of the area.

The above noted reference is very different than the present invention as we provide adjustment means for varying the distance between the two pieces, and in turn this allows the user to adjust the amount of light emitted there from to their particular liking. Or if preferred the user may adjust the light to reflect in a particular direction of choice. A further advantage of the present invention is that we also teach optional features, each of which will be addressed within the following specification.

SUMMARY OF THE INVENTION

It is therefore an object of the present invention to provide a decorative illumination apparatus that is especially aesthetically pleasing and is intended to substantially camouflage a light source within a decorative housing. Thus, the housing is unique as it is to be made from substantially any object which has been divided so as to form two half s, respectively. Such objects include but are not limited to a naturally formed rock, a natural seashell, an inanimate object such as a statue, a fake bush or shrub, a light post, a flag pole, etc.

It is another object of the present invention to provide a decorative illumination apparatus that allows a user to easily adjust the amount of light emitted from the apparatus, whereby the apparatus has a closed position, an intermediate position and an open position, respectively. Or if preferred the user may adjust the light to be emitted in a particular direction of choice.

Yet another object of the present invention is to provide a decorative illumination apparatus that may include additional options depending on consumer needs. Such options include, but are not limited to, the noted light source which may be either electrically connected to an external power supply such as a low voltage or any variable electrical outlet including 110 or the like, and associated circuitry typically used within most landscaping installations. Or if preferred the light source may be battery operated and/or solar powered, etc.

Still another object of the present invention is to provide a decorative illumination apparatus that may further include other options, such as the light source may be of any suitable type. For example, the light source may be in the form of a light bulb having novel features such as of the strobe, or black light variety, a colored bulb, interconnected to a photocell sensor and associated circuitry, fiber optics, or the like.

A further object of the present invention is to provide a decorative illumination apparatus wherein the noted options include a secret compartment located therein for concealment of an object of user choice. For example, the secret compartment may be used for hiding a key, money, jewelry, important papers, etc.

Also, a further object of the present invention is to provide a decorative illumination apparatus wherein the noted options further include a receptacle for removably receiving an object of user choice therein. For example, the receptacle may be in the form of a cup holder, or the like.

Yet a further object of the present invention is to provide a decorative illumination apparatus wherein the noted options may further include speakers, a motion sensor, or a combination of the noted options.

Still another object of the present invention is to provide a decorative illumination apparatus that is easily installed at the desired site without the need for any specialized tools or technical skills. However it is intended that an instructional manual be used and provided for proper installation and use.

Other objects and advantages will be seen when taken into consideration with the following specification and drawings.

BRIEF DESCRIPTION OF THE DRAWINGS

FIG. 1 is substantially an overview of a first embodiment for the present invention.

FIG. 2 is substantially an overview of a second embodiment for the present invention.

FIG. 7 is substantially an overview depicting an optional adjustment means.

FIG. 8 is substantially an overview of a second optional adjustment means.

FIG. 9 is substantially an enlarged overview of a light housing and an associated directional lens cap.

FIG. 10 is substantially a schematic for use with the present invention.

DETAILED DESCRIPTION OF THE DRAWINGS

Figure 3:
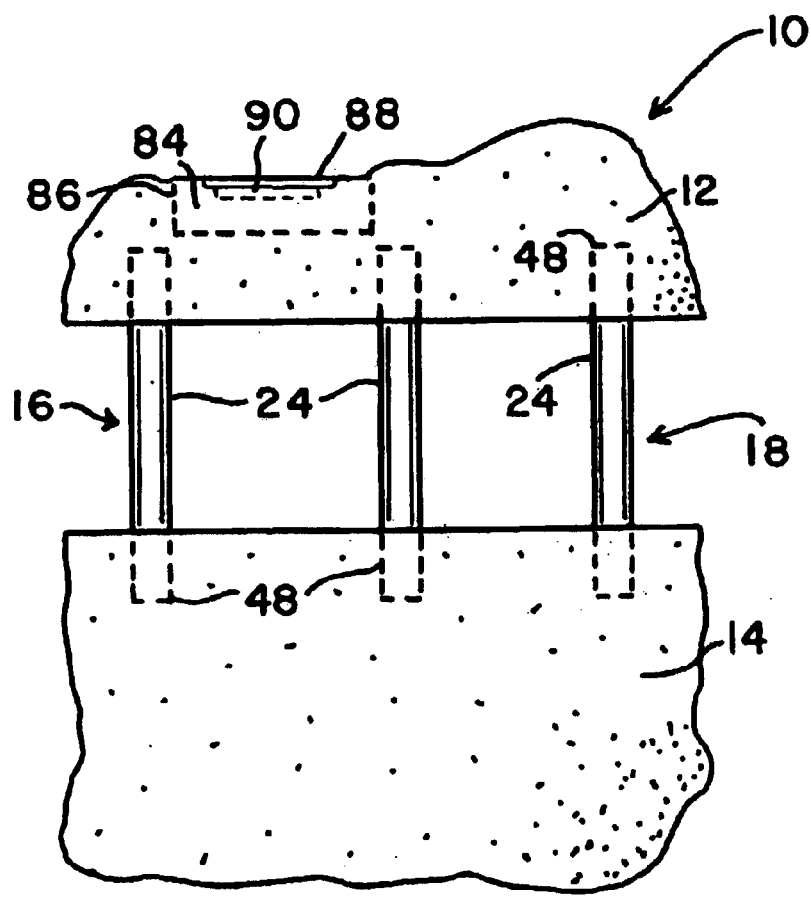
FIG. 3 is substantially an overview of a third embodiment for the present invention and exemplifies a fully open position.
Figure 4:
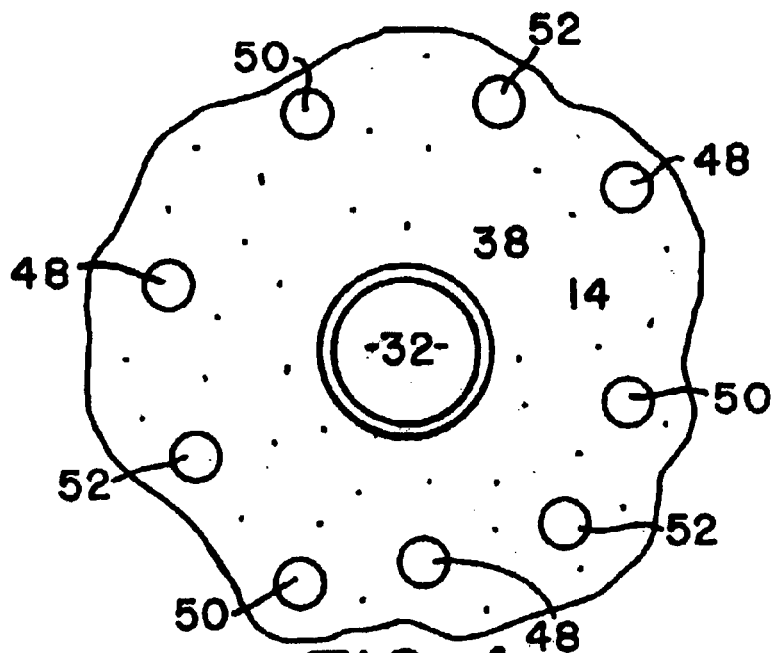
FIG. 4 is substantially a top view of the bottom section of the apparatus for the embodiment of FIG. 3.
Figure 5:
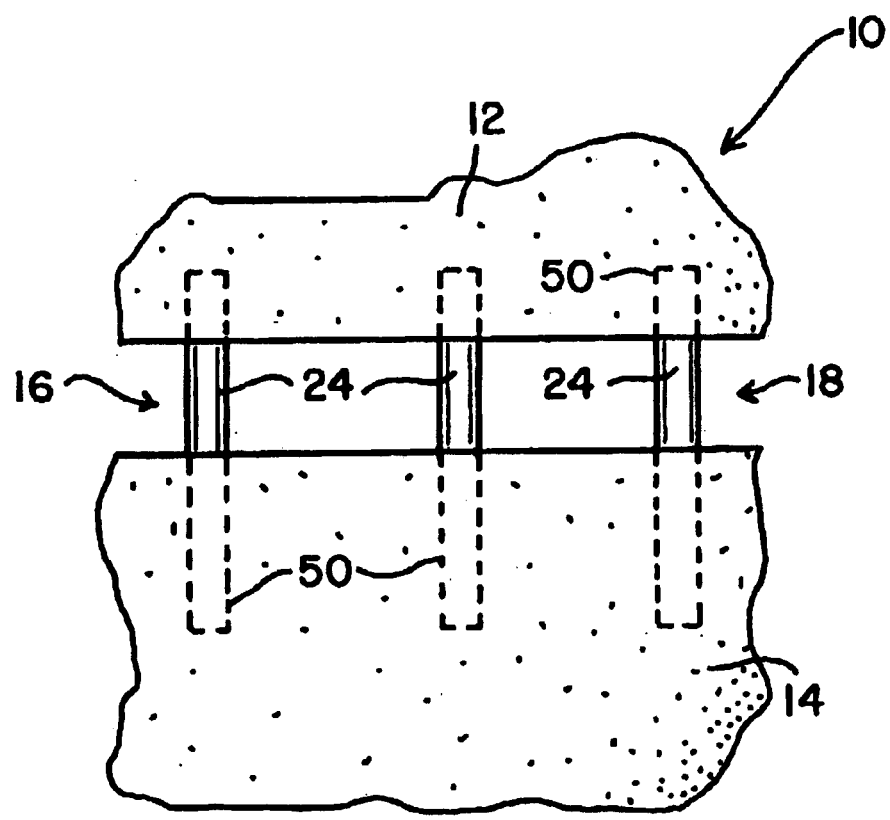
FIG. 5 is substantially an overview of the present invention depicting an intermediate position for the embodiment of FIG. 3.

Referring now in detail to the drawings wherein like characters refer to like elements throughout the various views. As depicted in FIGS. 1–3, (10) substantially represents an overview for the present invention hereafter referred to as a decorative illumination apparatus. It is to be understood the following description is only exemplary of some of the possible embodiments, materials and/or construction, as many variants are possible and the invention is not to be limited thereto.

As depicted in FIG. 1, (10) represents a first embodiment for the present invention comprising of a top section (12), a bottom section (14), attachment means (16) for removably interconnecting top section (12) and bottom section (14) together, adjustment means (18) that allows top section (12) and bottom section (14) to be fully adjustable between a closed position and an open position, and bottom section (14) having retaining means for retaining a light housing (20) therein for a light source (22). It is to be noted each section (12 & 14) may be made from any suitable object of choice, such as both sections (12 & 14) may be formed from one natural rock when the rock is cut in two, or any other object such as a seashell or the like.

Within the above embodiment, it is to be understood the preferred attachment means (16) and adjustment means (18) when combined include multiple threaded attachment legs (24) each having a first end and a second end. It is to be noted any number of attachment legs may be used, but in practice it has been found that three legs that are arranged in a triangular configuration are most functional. Also, the attachment legs may be made from any suitable material of choice, such as from a threaded stainless steel rod, or the like.

The embodiment of FIG. 1 further includes each section (12 & 14) having multiple holes (26) that are aligned in a triangular configuration and opposed to each other, respectively. Each of the multiple holes (26) further include a washer (28) attached thereon with the washer (28) having a threaded nut (30) attached thereon. It is to be understood each of the washers and nuts may be fixedly attached in place or threadably secured, depending on engineering choice. Furthermore, each of the noted ends of the multiple attachment legs (24) are of a shape and size to be threadably engaged within one of the multiple holes (26) and an associated washer (28) and nut (30). It is to be noted the attachment legs, washer and nut, are in actuality much smaller when manufactured and are only shown enlarged herein for clarity purposes.

Thus, it can now be seen the attachment means (16) and adjustment means (18) in combination allow each section (12 & 14) to be manually threadably adjusted between a closed position and an open position, respectively. Whereby, when each section (12 & 14) assume the closed position light emitted from light source (22) is not visible, and when each section (12 & 14) assume the open position, light emitted from the light source (22) is highly visible and illuminates outwardly from in between each section (12 & 14).

It is to be understood the noted light source (22) can be any suitable type of light of engineering choice, such as it may be battery operated, solar powered, a strobe light, a black light, or even fiber optic, etc. However, as depicted in the preferred embodiment of FIG. 1, the light source (22) is a typical light source having a bulb, a light housing (20), a lens cap (32), and typical electrical leads (34). It is to be noted the actual function and associated circuitry are not described herein as such information is well known within the electronic fields.

It is to be further understood the light source (22) may be installed in any suitable manner of engineering choice, thus the following retaining means is exemplary only.

As further seen in FIG. 1, bottom section (14) includes retaining means for retaining light housing (20) therein for light source (22). The retaining means substantially comprising the bottom section (14) having an open ended vertical cavity (36) that is of a shape and size to slidably receive an internal sleeve (38). The sleeve (38) having a top end, a bottom end, and is of a length less than the overall length or depth of open-ended vertical cavity (36). As depicted herein, it can clearly be seen that the top end of internal sleeve (38) provides a lip (40), and the light housing (20) which contains the light source (22) along with associated electrical leads (34) and the lens cap (32) which is attached thereon, may be easily slidably positioned within internal sleeve (38) and the lens cap (32) may be easily positioned and removably retained in a level manner on top of lip (40) respectively. This embodiment is very functional as it allows the user to easily change the bulb when needed as the entire light housing can be easily lifted up and out of the cavity (36). Also, in this arrangement the light emitted from the light source (22) is visible in 360 degrees, respectively.

As an alternative, if the user is desirous of directing the light emitted from the light source (22) in one particular direction, respectively, this can easily be achieved by incorporating the following variation: As depicted in FIG. 3, internal sleeve (38) further includes an internal ledge (42). It is to be noted internal sleeve (38) can be formed from substantially any suitable material of engineering choice, but in practice it has been found that if made from a length of PVC pipe, the internal ledge (42) can also be plastic and glued onto the internal wall thereof which proves to be most advantageous and functional. It can clearly be seen that in this assembly the lens cap (32) may be easily positioned and removably retained on top of lip (40) and the ledge (42)

simultaneously in a non-level tilted manner, which in turn causes the light emitted from light source (22) to be adjustably directional when installed.

Another alternative for limiting the direction of the emitted light is further depicted in FIG. 2. Wherein the object is substantially a natural rock but it has not been cut into two sections, rather only a partial section of the rock has been removed and thus the light being emitted is further limited by the rock wall itself and inadvertently directs the light outwardly from the partial cutaway section in a controlled manner. Further illustrated in FIG. 2, the preferred light source is of the typical battery operated variety including a battery not shown that is contained within a battery compartment (44) and associated circuitry (not shown).

Referring now to FIGS. 3–6 which illustrate another embodiment for the present invention. Wherein the noted attachment means (16) and adjustment means (18) in combination comprise of the attachment means being at least three support legs (24) each having a first end which is fixedly attached within top section (12) and a second end which protrudes downwardly from within top section (12) and the at least three support legs (24) being substantially arranged into a triangular configuration. The noted adjustment means being at least three sets of openings, including a first set (48), a second set (50) and a third set (52). Each of the at least three sets of openings (48, 50 & 52) having different depths and each set is arranged into a triangular configuration so as to mate with the at least three support legs (24), respectively.

Figure 6:
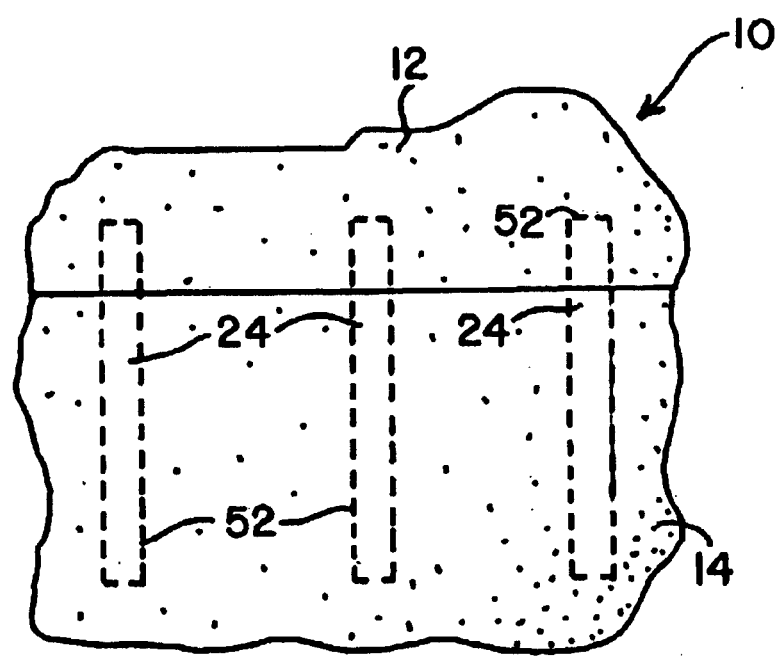
FIG. 6 is substantially an overview of the present invention depicting a closed position for the embodiment of FIG. 3.

Whereby, it can now be seen when the second end of each at least three support legs (24) are positioned within first set (48) of at least three sets of openings each section (12 & 14) assume a closed position, see FIG. 6. When the second end of each at least three support legs (24) are positioned within second set (50) of at least three sets of openings each section (12 & 14) assume an intermediate position, see FIG. 5. When the second end of each at least three support legs (24) are positioned within the third set (52) of at least three sets of openings each section (12 & 14) assume an open position, see FIG. 3.

Referring now to FIGS. 7 & 8 which illustrate yet another embodiment for the present invention. It is to be understood these figures are substantially cut-a-way views and the bottom section (14) is only partially shown for clarity purposes. As can be seen therein, the attachment means (16) and adjustment means (18) in combination comprising of the adjustment means including at least a first set of plug inserts (54), at least a second set of plug inserts (56) and at least one set of openings (58), with the openings (58) being arranged into a triangular configuration, respectively. While the attachment means is at least three support legs (24) each having a first end which is fixedly attached within top section (12) and a second end which protrudes downwardly from within top section (12) and at least three support legs (24) being arranged into a triangular configuration so as to mate with openings (58), respectively. As further shown in FIGS. 7 & 8, first set of plug inserts (54) provide a first predetermined depth and second set of plug inserts (56) provide a second predetermined depth with the first predetermined depth being deeper than second predetermined depth.

Whereby, it can now be seen when the second end of each at least three support legs (24) are positioned within at least one set of openings (58), each section (12 & 14) assume the closed position, when first set of plug inserts (54) are inserted into at least one set of openings (58) and the second end of each at least three support legs (24) are positioned within first set of plug inserts (54), each section (12 & 14) assume an intermediate position, and when second set of plug inserts (56) are inserted into at least one set of openings (58) and the second end of each at least three support legs (24) are positioned within second set of plug inserts (56), each section (12 & 14) assume an open position. It can now clearly be seen that this embodiment is very functional and allows the user to easily adjust the distance between each section (12 & 14). This is further advantageous as the support legs need not be threaded, nor is there a need for any washers or nuts. However, it is to be noted that any amount of different sized plugs may be used, depending on how many positions are desired.

Referring now to FIG. 9, wherein we depict another embodiment for the light source, substantially comprising of a light housing (60) for containment of a typical light source such as a bulb (not shown) and associated circuitry (not shown). Light housing (60) further having a removably attached lens cap (62) and a directional bonnet (64) that may be removably frictionally engaged onto lens cap (62) or fixedly engaged if desired. Directional bonnet (64) having a partial cut-a-way section which allows light emitted from light source (22) to be directed outwardly from within the cut-a-way section in a controlled manner. This is very advantageous as it allows a user to easily position the bonnet (64) onto lens cap (62) and direct the light in a direction of their choosing. Also, if desired the bonnet (64) may be colored so as to blend in with the object that is to be illuminated and/or the bonnet may have an internal coating made from a light reflective material (not shown) of engineering choice.

Referring now to FIG. 10, which substantially represents a schematic for one embodiment of the present invention. Wherein, it is to be understood that as previously noted, light source (22) may be powered by batteries (66), with batteries (66) being in electrical communication with solar panels (68) and this allows the batteries to be readily recharged in an economical efficient manner.

As previously addressed, the present invention may include additional accessory options, such as illustrated in FIG. 1, wherein we illustrate top section (12) having at least one receptacle (70) for removably receiving an object therein. It is to be noted any object of user choice may be inserted and supported by receptacle (70), for example the object may be a flag pole, incense, or the like. Also, receptacle (70) may be located at any suitable position of engineering choice, thus the location as depicted herein is only exemplary.

Another accessory option is illustrated in FIG. 2, wherein we depict a secret compartment (72) that may be used for concealment of an object that has been hidden therein, and secret compartment (72) further having a removable lid member (74) for easy access into compartment (72) and lid member (74) includes some type of finger grip (76). Any suitable type of finger grip may be used, however it may be desirable to make a recessed finger grip so as not to be easily visible.

Yet another option is depicted in FIG. 2, wherein we further provide a different receptacle for receiving an object therein, such as the receptacle may be in the form of a cup-holder (78), or the like.

Still another accessory option is depicted in FIG. 2, wherein the present apparatus includes at least one speaker (80). It is to be understood any suitable type of speaker (or speakers) may be incorporated depending on engineering choice. However, a speaker (80) that is housed within a compartment (not shown) within the apparatus (10) having electrical lead lines (82) as depicted herein is most functional.

A further accessory option is depicted in FIG. 3, wherein we provide the apparatus (10) with a motion detector (84). Again, there are many different types of suitable motion detectors, thus the detector as depicted herein is only exemplary. However, it may be advantageous to use a battery operated motion detector (84) that is housed within a compartment (86) and the detector (84) having a removable recessed lid member (88) for easy replacement of the battery (90).

It will now be seen we have herein provided a novel decorative illumination apparatus which can be made on site from any suitable object of choice. The object can be in the form of a natural rock or the like and allows the user to easily adjust the amount of light emitted there from and/or the direction to which the light is emitted. Also, we provide unique optional accessory features that provide unusual results heretofore not taught within the known prior art.

Although the invention has been herein shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatuses.

Having described our invention, what we claim as new and desire to secure by Letters Patent is:

1. A decorative illumination apparatus comprising: a top section; a bottom section; attachment means; adjustment means; and a light source; said attachment means removably interconnecting said top section and said bottom section together, said adjustment means allowing said top section and said bottom section to be fully adjustable between a closed position and an open position, said bottom section having retaining means for retaining a light housing therein for said light source, said attachment means and said adjustment means in combination comprising: a plurality of threaded attachment legs each having a first end and a second end, each said section having a plurality of holes, said plurality of holes of each said section being aligned and opposed to each other, each said plurality of holes having a washer attached thereon, said washer having a threaded nut attached thereon, and each said end of each said plurality of attachment legs being of a shape and size to be threadably engaged within one of said plurality of holes and an associated said washer and said nut.

2. The apparatus of claim 1 wherein said top section and said bottom section are both formed from one natural rock when said natural rock is cut in two.

3. The apparatus of claim 1 wherein said light source is battery operated.

4. The apparatus of claim 1 wherein said light source is solar powered.

5. The apparatus of claim 1 wherein said light source is a strobe light.

6. The apparatus of claim 1 wherein said light source is a black light.

7. The apparatus of claim 1 further includes a secret compartment that is used for concealment of an object.

8. The apparatus of claim 1 wherein said bottom section having retaining means for retaining a light housing therein for said light source comprising: said bottom section having an open ended vertical cavity, said open ended vertical cavity having an internal sleeve, said internal sleeve having a top end and a bottom end, said internal sleeve being of a length less than said open ended vertical cavity, said top end of said internal sleeve providing a lip, said light housing containing said light source with associated electrical leads, said light housing having a lens cap thereon, said light housing being slidably positioned within said internal sleeve, and said lens cap being positioned and removably retained in a level manner on top of said lip.

9. The apparatus of claim 8 wherein said internal sleeve further includes an internal ledge, and said lens cap being positioned and removably retained on top of said lip and said ledge simultaneously in a non-level tilted manner which in turn causes said light emitted from said light source to be adjustably directional.

10. The apparatus of claim 1 further includes at least one receptacle for removably receiving an object therein.

11. The apparatus of claim 1 further includes at least one speaker.

12. The apparatus of claim 1 further includes a motion detector.

\* \* \* \* \*